United States Patent [19]

Makabe et al.

[11] Patent Number: 5,079,330

[45] Date of Patent: Jan. 7, 1992

[54] POLYOXYMETHYLENE MULTI-COPOLYMER AND ITS RESIN COMPOSITION

[75] Inventors: Yoshiki Makabe, Nagoya, Japan; Shigeru Okita, Shaker Heights, Ohio; Yoshiyuki Yamamoto, Suzuka, Japan

[73] Assignee: Toray Industries, Inc., Japan

[21] Appl. No.: 562,729

[22] Filed: Aug. 6, 1990

[30] Foreign Application Priority Data

Aug. 9, 1989 [JP] Japan ............................ 1-207298
Aug. 9, 1989 [JP] Japan ............................ 1-207299

[51] Int. Cl.$^5$ .............................................. C08G 65/26
[52] U.S. Cl. ............................... 528/87; 528/101; 528/245; 528/248; 528/250; 528/253; 528/393; 528/406; 525/398; 525/403; 525/405; 525/407
[58] Field of Search ............. 528/87, 101, 245, 248, 528/250, 253, 393, 406; 525/398, 403, 405, 407

[56] References Cited

U.S. PATENT DOCUMENTS

| | | | |
|---|---|---|---|
| 3,275,604 | 9/1966 | Kray et al. | 528/241 |
| 3,346,663 | 10/1967 | Kern et al. | 525/58 |
| 3,385,827 | 5/1968 | Fischer et al. | 528/249 |
| 3,627,850 | 12/1971 | Hafner et al. | 525/400 |
| 3,631,124 | 12/1971 | Burg et al. | 525/405 |
| 4,070,415 | 1/1978 | Sextro et al. | 525/414 |
| 4,427,807 | 1/1984 | Zimmerman et al. | 523/466 |

Primary Examiner—John Kight, III
Assistant Examiner—S. A. Acquah
Attorney, Agent, or Firm—Austin R. Miller

[57] ABSTRACT

A polyoxymethylene multi-copolymer obtainable by copolymerizing (a) trioxane,
(b) at least one cyclic ether or formal compound chosen from the group of ethylene oxide, 1,3-dioxolane, 1,3-dioxepane, 1,3,5-trioxepane and 1,3,6-trioxocane, and
(c) at least one compound chosen from the group of glycidyl phenyl ether, styrene oxide and glycidyl naphthyl ether, and characterized in that the number average molecular weight of said polyoxymethylene multi-copolymer is from 10,000 to 100,000, that the melting point (Tm) and crystallization temperature (Tc) there of are in a relationship of $$Tm - Tc < 15 \ (^\circ C.)$$

and that the size of the spherulites is 10 μm or less, or a resin composition comprised of this polyoxymethylene multi-copolymer and a polyoxymethylene resin, is distinguished in crystallinity, mechanical strength and surface appearance and is particularly suited for faster cycle molding.

17 Claims, No Drawings

POLYOXYMETHYLENE MULTI-COPOLYMER AND ITS RESIN COMPOSITION

BACKGROUND OF THE INVENTION

This invention relates to a polyoxymethylene multi-copolymer distinguished in injection moldability or, particularly, faster cycle performance and mechanical property.

More specifically, this invention relates to a polyoxymethylene multi-copolymer used for injection molding which is distinguished in faster speed of solidification in the mold in injection molding to allow molding with the molding time reduced and also in the mechanical property on account of the smaller size of spherulites and consequently reduced molding strain.

The invention also relates to a polyoxymethylene resin composition distinguished in surface appearance, crystallinity, mechanical strength and molding efficiency.

The polyoxymethylene resin is known as an engineering plastic well balanced in mechanical strength and impact resistance and is used in extensive fields as automobile parts and electronic equipment parts.

However, the polyoxymethylene resin has a very high crystallinity the spherulite structure growing as the result of which produces cracking or internal tension to reduce the mechanical strength of the resin.

Also, the polyoxymethylene resin is worked up generally by injection molding, and in this field of injection molding, improvement of the productivity through reduction of the molding cycle or the so-called faster cycle is urgently called for.

For improvement of the mechanical strength of the polyoxymethylene resin, it is required to reduce the size of spherulites and homogenize the spherulite structure. For the faster cycle, the method of accelerating the speed of crystallization and thus the speed of solidification in the mold is effective. For implementation of the finer and more homogeneous crystalline structure and improvement of the speed of crystallization, there were proposed various methods of adding nucleating agents comprised of an inorganic compounds, an organic compounds and a polymeric compound. For example, Patent Publications Nos. SH059-129247 and SH055-19942 disclose a method of using a branched or cross-linked polyoxymethylene resin as a nucleating agent, and Patent Publication No. SH048-8254 describes addition of an inorganic compound represented by talc as a nucleating agent.

However, the resin compositions noted in the foregoing Patent Publications Nos. SH059-129247, SH055-9942 and SH048-8254 have not the crystallization speed sufficiently improved, and so not only the satisfactorily faster cycle is not expectable, but the improvement of the mechanical strength through finer and more homogeneous crystalline structure of the obtainable mold is insufficient. Thus, they hardly satisfy the high mechanical strength required for application to electric and electronic equipment parts and automobile parts.

SUMMARY OF THE INVENTION

An object of the present invention is to provide a polyoxymethylene multi-copolymer distinguished in injection moldability or, more particularly, faster cycle performance and mechanical property, or its mold product.

Another object of the present invention is to provide a polyoxymethylene resin composition or its mold product distinguished in surface appearance, crystallinity, mechanical strength and molding efficiency.

To achieve the foregoing objects, there is provided, according to the present invention, a polyoxymethylene multi-copolymer which is obtainable by copolymerizing:

(a) Trioxane;

(b) At least one compound of cyclic ethers or formals chosen from the group of ethylene oxide, 1,3-dioxolane, 1,3-dioxepane, 1,3,5-trioxepane and 1,3,6-trioxocane; and (c) At least one compound chosen from the group comprised of glycidyl phenyl ether, styrene oxide and glycidyl naphthyl ether, and which is characterized in that said polyoxymethylene multi-copolymer is of a number average molecular weight of 10,000 to 100,000, that its melting temperature (Tm) and crystallization temperature (Tc) are of the relationship of $$Tm - Tc < 15 \; (^\circ C.)$$

and that the spherulites are of a size of 10 $\mu m$ or less.

Also, according to the present invention, there is provided a polyoxymethylene resin composition comprising (A) 100 parts by weight of a polyoxymethylene resin and (B) 0.001 to 100 parts by weight of a polyoxymethylene multi-copolymer which is obtainable by co-polymerizing:

(a) Trioxane;

(b) At least one compound of cyclic ethers or formals chosen from the group comprised of ethylene oxide, 1,3-dioxolane, 1,3-dioxepane, 1,3,5-trioxepane and 1,3,6-trioxocane; and (c) At least one compound chosen from the group comprised of glycidyl phenyl ether, styrene oxide and glycidyl naphthyl ether.

Further, according to the present invention, there is provided a mold product manufactured from said polyoxymethylene multi-copolymer.

Further, according to the present invention, there is provided a mold product manufactured from said polyoxymethylene resin composition.

DESCRIPTION OF THE PREFERRED EMBODIMENTS

First, the oxymethylene multi-copolymer will be described.

The method of manufacturing the oxymethylene multi-copolymer of the present invention is not particularly limited. For example, it can be produced by dissolving or suspending the component (a) or trioxane; component (b) or at least one cyclic ether or formal compound chosen from the group of ethylene oxide, 1,3-dioxolane, 1,3-dioxepane, 1,3,6-trioxepane and 1,3,6-trioxocane; and component (c) or at least one compound chosen from the group of glycidyl phenyl ether, styrene oxide and glycidyl naphthyl ether, in an organic solvent such as cyclohexane, adding a Lewis acid catalyst for polymerization, then removing by decomposition the unstable terminals. Preferably, a method using no solvent at all but a self-cleaning type mixer for bulk polymerization, deactivating the catalyst with a hindered amine compound, then removing the unstable terminals by decomposition, is cited. As a Lewis acid catalyst, boron trifluoride, a hydrate of boron trifluoride, or a coordination compound of an organic compound having oxygen or sulfur atoms with boron trifluoride, is preferably used. The Lewis acid catalyst is added preferably in an amount of 0.001 to 0.1 part by weight or more preferably in an amount of 0.005 to 0.05 part by weight to 100 parts by weight of trioxane. The reaction temperature for bulk polymerization is preferably 60° to 120° C. or more preferably 60° to 90° C. The hindered amine compound refers to any of the compounds having a hindered amine skeleton in the molecule such as bis(1,2,2,6,6-pentamethyl-4-piperdinyl) sebacate, bis(2,2,6,6-tetramethyl-4-piperidinyl) sebacate, succinyl dimethyl-1-(2-hydroxyethyl-2,2,6,6-tetramethylpiperidine) polycondensation product, and 1-[2-[3-(3,5-di-t-butyl-4-hydroxyphenyl)propionyloxy]ethyl]-4-3-(3,5-di-t-butyl-4-hydroxyphenyl)propionyloxy]-2,2,6,6-tetramethylpiperidine), and it is added preferably in an amount equivalent to 0.1 to 20 nitrogen atoms in the hindered amine compound per boron atom in the catalyst.

The amount of copolymerization of the component (b) or at least one cyclic ether or formal compound chosen from the group of ethylene oxide, 1,3,-dioxolane, 1,3-dioxepane, 1,3,5-trioxepane and 1,3,6-trioxocane, in the polyoxymethylene multi-copolymer of the present invention, is preferably 0.01 to 20 parts by weight or, more preferably, 0.1 to 7 parts by weight to 100 parts by weight of the component(a) or trioxane. When it is less than 0.01 part by weight, the heat stability tends to decrease, and when it exceeds 20 parts by weight, it is difficult to obtain a polymer distinguished in mechanical strength, and so such an amount is not preferable.

The amount of copolymerization of the component (c) or at least one compound chosen from the group of glycidyl phenyl ether, styrene oxide and glycidyl naphthyl ether, in the polyoxymethylene multi-copolymer of the present invention, is preferably 0.001 to 10 parts by weight or, more preferably, 0.01 to 5 parts by weight to 100 parts by weight of the component (a) or trioxane. When it is less than 0.001 part by weight, the effect of improvement for faster cycle is not appreciable, and when it exceeds 10 parts by weight, the impact strength decreases, and so such an amount is not preferable.

The polyoxymethylene multi-copolymer of the present invention is preferably of a number average molecular weight of 10,000 to 100,000 when it is independently used for molding. This number average molecular weight is obtainable by the MI value determined at 190° C. and under a load of 2190 g according to ASTM D1238 with a pellet dried in a 80° C. hot oven used by the formula $$Mn = 75,000 - 16,000 \times \ln (MI)$$

Mn: Number average molecular weight
MI: MI value

When the polyoxymethylene multi-copolymer is independently used for molding, if the number average molecular weight is greater than 100,000, the flow at the time of injection molding decreases to preclude molding of a thin wall product. If it is less than 10,000, the impact strength decreases, and so such is not suitable.

In order for the polyoxymethylene multi-copolymer of the present invention to be distinguished by itself in the faster cycle moldability and mechanical property, it is required that the melting point (Tm) and the crystallization temperature (Tc) of the polyoxymethylene multi-copolymer are in the relationship of $$Tm - Tc < 15 \ (° C.)$$

and that the spherulites are of a size of 10 μm or less. If Tm−Tc is 15° C. or greater, the speed of solidification in the mold is retarded, resulting in less effect of reducing the molding time, and if the size of spherulites exceeds 10 μm, there remains a considerable molding strain after injection molding, resulting in degradation of the mechanical property.

For determination of the melting point (Tm) and crystallization temperature (Tc) under the invention, there was employed a method of heating the sample in nitrogen atmosphere from 80° C. to 220° C. at a rate of 10° C./minute, maintaining at 220° C. for 5 minutes, then lowering the temperature at a rate of 10° C./minute to measure the crystallization temperature, and thereafter cooling to 110° C., then raising the temperature at a rate of 10° C./minute to measure the melting point.

For determination of the size of spherulites, there was employed a method of holding 10 mg of the polyoxymethylene multi-copolymer between cover glasses, heating on a hot stage and melting at 230° C. for 1 minute, then lowering the temperature to 130° C. at a rate of 10° C./minute while observing through a polarizing microscope, then photomicrographing the produced crystals to obtain the spherulite size.

Next, the polyoxymethylene resin composition comprised of (A) polyoxymethylene resin and (B) polyoxymethylene multi-copolymer will be described.

First, the polyoxymethylene resin (A) will be described. The polyoxymethylene resin (A) used in the polyoxymethylene composition according to the present invention means an oxymethylene homopolymer or an oxymethylene copolymer comprising 85% by weight or more of an oxymethylene unit or units and 15% by weight or less of an oxymethylene unit or units having 2 to 8 adjacent carbon atoms.

The oxymethylene homopolymer may be produced by, for example, introducing substantially anhydrous formaldehyde to an organic solvent containing a basic polymerization catalyst such as an organic amine and carrying out the polymerization, then acetylating the terminals with acetic anhydride.

The oxymethylene copolymer may be produced by, for example, dissolving or suspending substantially anhydrous trioxane and a copolymeric component such as ethylene oxide, 1,3-dioxolane, 1,3-dioxepane, 1,3,5-trioxepane or 1,3,6-trioxocane in an organic solvent such as cyclohexane and carrying out the polymerization with a Lewis catalyst such as boron trifluoride-diethyl etherate added, then decomposing and thus removing the unstable terminals. Preferably, there may be employed a method of using no solvent at all but introducing trioxane, a copolymeric component and a pre-catalyst to a self-cleaning type mixer for bulk polymerization, then deactivating the catalyst with a hindered amine and removing the unstable terminals by decomposition.

The amount for copolymerization of the copolymeric component such as ethylene oxide, 1,3-dioxolane, 1,3,5-trioxepane or 1,3,6-trioxocane of the oxymethylene copolymer of the present invention is 0.01 to 20 parts by weight, preferably 0.1 to 7 parts by weight, for 100 parts by weight of trioxane. When it is less than 0.01 part by weight, the polymer yield tends to decrease at thermal stabilization, and when it is more than 20 parts by weight, it is difficult to obtain a polymer which is distinguished in mechanical strength.

The amount of addition of the polymerization catalyst is preferably 0.001 to 0.1 part by weight, or more preferably 0.005 to 0.05 part by weight, for 100 parts by weight of trioxane.

The temperature for bulk polymerization is preferably within the range of 60° to 120° C., more preferably 60° to 90° C. After polymerization, it is preferable to deactivate the catalyst with a hindered amine, then remove the unstable terminals for decomposition.

Second, the polyoxymethylene multi-copolymer (B) will be described in the following.

The polyoxymethylene multi-copolymer (B), when it is used for the polyoxymethylene resin composition of the present invention, has not the number average molecular weight, Tm, Tc and spherulite size of the copolymer limited in any way, as it has when it is independently used for molding.

In such case, the polyoxymethylene multi-copolymer (B) is added as a moldability improving agent or nucleating agent of the polyoxymethylene resin (A) so that it is not always required to have a number average molecular weight, Tm, Tc and spherulite size enough to form an excellent mold product.

However, it is preferable that the polyoxymethylene multi-copolymer (B) has, if possible, the number average molecular weight, Tm, Tc and spherulite size described in the foregoing, that is, an average molecular weight of 10,000 to 100,000 a Tm and Tc relationship of $Tm - Tc < 15$ (° C.) and a spherulite size of 10 $\mu$m or less even when it is used as a moldability improving agent or nucleating agent.

The polyoxymethylene resin composition of the present invention may be provided by mixing the polyoxymethylene Resin (A) and polyoxymethylene multi-copolymer with each other in the form of pellets, powder or grains, then directly subjecting the mixture to melting, but a method of melt mixing by means of Banbury mixer, rolls or extruder is also usable. The mixing temperature is preferably 150° to 250° C., or more preferably 180° to 200° C.

In the polyoxymethylene resin composition of the present invention, the content of the polyoxymethylene multi-copolymer is 0.001 to 100 parts by weight for 100 parts by weight of the polyoxymethylene resin. If it is less than 0.001 part by weight, the multi-copolymer fails to provide a satisfactory effect as a nucleating agent, and so a sufficient mechanical strength as well as crystallization speed is not obtainable.

The polyoxymethylene resin composition composed as stated in the foregoing according to the present invention has a very distinguished mechanical strength well balanced with the impact resistance. Such physical property is provided as said polyoxymethylene multi-copolymer works as a nucleating agent to develop a fine and homogeneous crystalline structure.

Actually, in the crystalline structure of the injection mold, the polyoxymethylene resin using no nucleating agent presents a structure of coarse spherulites of a size of 150 to 200 microns, but the polyoxymethylene resin composition of the present invention presents a fine and homogeneous spherulite structure of 60 microns or less. Furthermore, both Izod impact strength and tensile strength are improved by 10%. Also, the crystallization temperature is elevated by 2° to 8° C., and so the difference between the melting point and the crystallization temperature is reduced to 25° C. or less when the oxymethylene homopolymer is used as the polyoxymethylene resin, or 18° C. or less when the oxymethylene copolymer is used as the polyoxymethylene resin, so that it is enabled to reduce the molding cycle in injection molding.

Thus, according to the present invention, there is provided a polyoxymethylene resin composition having a fine and homogeneous spherulite structure and a high strength in uniform quality, and further it is one of the advantages that the classification or purification, which is required when an inorganic compound is used as a nucleating agent, is no longer required.

Also, in the polyoxymethylene multi-copolymer or polyoxymethylene resin composition of the present invention, there may be included, to such an extent that the object of the invention is not hindered, a known additive or additives such as an antioxidant of hindered phenol, phosphite, thioether or amine type; a weathering-proof agent of benzophenone, benzotriazole or hindered amine type; a formaldehyde scavenger such as melamine, dicyandiamide, a polyamide or a polyvinyl alcohol copolymer; a release agent such as a fluorine containing polymer, a silicone oil or a polyethylene wax; a colorant such as a dye or a pigment; an ultraviolet ray screening agent such as titanium oxide or carbon black; a reinforcing agent such as fiber glass, carbon fiber or potassium titanate fiber; a filler such as silica, clay calcium carbonate, calcium sulfate or glass bead; a nucleating agent such as talc; a flame retardant; a plasticizer; an auxiliary adhesive agent; and/or a tackifier. Moreover, in order to further improve the mechanical strength of the polyoxymethylene copolymer of the present invention, any other thermoplastic polymer or thermoplastic elastomer may be incorporated.

EXAMPLES

The invention will now be described in detail with reference to the following examples. In the examples, the "%" and "parts" are all based on weight. The molding cycle and mechanical property were determined as described below.

Molding cycle: Using an injection molding machine having an injection capacity of 5 ounces, square plates of 80×80×3 mm were molded with the cylinder temperature set to 190° C., mold temperature to 60° C., injection time to 5 seconds and the cooling time changed, and the cooling time at which the deformation due to four ejector pins was such that when three vertexes of the mold were placed on a plane, the deviation of the remaining one vertex from the plane would be 1 mm or less, was measured.

Molding: Using an injection molding machine having an injection capacity of 5 ounces, ASTM No.1 dumbbell test specimens and Izod impact test specimens were molded, with the cylinder temperature set to 190° C., mold temperature to 65° C. and molding cycle to 50 seconds, and in the test, the exterior of the ASTM No.1 dumbbell test specimens was visually inspected.

Mechanical properties: Using the ASTM No.1 dumbbell test specimens obtained by the foregoing injection molding, the tensile strength was determined according to ASTM D638, and using the Izod impact test specimens, the impact strength was determined according to ASTM D256.

MI value: Using pellets dried in an oven at 80° C. for 3 hours, the MI value was determined according to ASTM D1238 at a temperature of 190° C and under a load of 2160 g.

Spherulite size: The size was measured by placing 10 mg of the polyoxymethylene resin composition between cover glasses, heating on a hot stage to melt the same at 230° C. for 1 minute, then lowering the temperature to 130° C. at a rate of 10° C./minute and observing the produced crystals through a polarizing microscope and photomicrographing the same.

Melting point (Tm) and crystallization temperature (Tc): Using a differential scanning calorimeter (DSC) and heating the composition from 80° C. to 220° C. at a rate of 10° C./minute in nitrogen atmosphere, maintaining the temperature at 220° C. for 5 minutes, then lowering the temperature at a rate of 10° C./minute, the crystallization temperature was measured. Further, cooling to 110° C. once, then raising the temperature at a rate of 10° C./minute, the melting point was measured.

EXAMPLES 1 THROUGH 10 AND REFERENCES 1 THROUGH 5

Continuous polymerization was made with trioxane, a compound of the component (b), a compound of the component (c), boron trifluoride diethyl etherate in 100 ppm to trioxane (2.5% benzene solution) and methylal or modifier, fed to a 100 mm$\phi$, L/D=10 twin screw continuous mixer "S4 KRC Kneader" (product of Kurimoto, Ltd.). The polymerization temperature was controlled to about 60° C. by feeding hot water to the jacket, and the speed of revolution was set at 60 rpm. The compound of the component (c) and methylal as a molecular weight regulator were dissolved in trioxane. Also, a preliminary mixing zone was provided so that the compound of the component (b) and the catalyst solution were preliminary admixed immediately before they were fed to the kneader. The polymer was obtained in the form of a white fine powder.

To 10 kg of the powder thus obtained, a solution of 27 g of bis(1,2,2,6,6-pentamethyl-4-piperidinyl) sebacate dissolved in 200 ml of benzene was added to deactivate the catalyst, then 10 g of calcium stearate and 50 g of 1,6-hexanediol bis(3-(3,5-di-t-butyl-4-hydroxyphenyl)-proprionate) ("Irganox" 259 of Chiba-Geigy) were added, and the mixture was stirred in a Henshel mixer for 10 minutes. Using a 35 mm$\phi$, L/D=30 twin screw extrusion machine with a vent, the obtained mixture was melted and stabilized at a cylinder temperature of 230° C. and a vent vacuum of 5 Torr, then it was extruded into water, and through cutting, there was obtained a polyoxymethylene copolymer in the form of pellets. Check of the composition of the obtained polyoxymethylene copolymer was made by the 60 MHz $^1$H NMR (in d$_2$-hexafluoroisopropanol solvent). For example, where glycidyl phenyl ether was used as the compound of the component (c), there were detected a multiplet signal particular to phenyl group at $\delta$6.9–7.6 (ppm) in addition to a signal of methylene group at $\delta$4.3–5.2 (ppm), and so the copolymer was confirmed to be a glycidyl phenyl ether copolymer. Further, by the integration ratio, it was confirmed that the components were copolymerized according to the amounts of addition.

The copolymeric compositions and physical properties of the polyoxymethylene multi-copolymers thus obtained are shown in Table 1. From Table 1, it is apparent that the polyoxymethylene multi-copolymers according to the present invention are distinguished in the injection moldability and mechanical properties.

TABLE 1

| | Copolymeric compositions of polyoxymethylene multi-copolymers (parts by weight) | | | | | MI value (g/10 min) |
|---|---|---|---|---|---|---|
| | Trioxane | Component (b) compounds | Copolymeric amount | Component (c) compounds | Copolymeric amount | |
| Example 1 | 100 | 1,3-Dioxolane | 3.0 | Glycidyl phenyl ether | 1.0 | 20.4 |
| Example 2 | 100 | 1,3-Dioxolane | 3.0 | Styrene oxide | 1.0 | 18.7 |
| Example 3 | 100 | 1,3-Dioxolane | 3.0 | Glycidyl Naphthyl ether | 1.0 | 23.4 |
| Example 4 | 100 | Ethylene oxide | 3.0 | Glycidyl phenyl ether | 1.0 | 19.8 |
| Example 5 | 100 | 1,3-Dioxepane | 3.0 | Glycidyl phenyl ether | 1.0 | 22.7 |
| Example 6 | 100 | 1,3,5-Trioxepane | 3.0 | Glycidyl phenyl ether | 1.0 | 23.5 |
| Example 7 | 100 | 1,3,6-Trioxocane | 3.0 | Glycidyl phenyl ether | 1.0 | 22.1 |
| Example 8 | 100 | 1,3-Dioxolane | 1.0 | Glycidyl phenyl ether | 0.3 | 9.0 |
| Example 9 | 100 | 1,3-Dioxolane | 1.0 | Glycidyl phenyl ether | 3.0 | 52.1 |
| Example 10 | 100 | 1,3-Dioxolane | 1.3 | Glycidyl phenyl ether | 0.3 | 1.1 |
| Reference 1 | 100 | 1,3-Dioxolane | 3.0 | — | — | 9.2 |
| Reference 2 | 100 | 1,3-Dioxolane | 3.0 | Glycidyl phenyl ether | 0.0005 | 8.8 |
| Reference 3 | 100 | 1,3-Dioxolane | 3.0 | Glycidyl phenyl ether | 15 | 73.4 |
| Reference 4 | 100 | 1,3-Dioxolane | 0.005 | Glycidyl phenyl ether | 0.5 | 15.3 |
| Reference 5 | 100 | 1,3-Dioxolane | 25 | Glycidyl phenyl ether | 0.5 | 62.5 |

| | Tm-Tc (°C.) | Spherulite size (μm) | Molding cycle cooling time (sec) | Tensile strength (MPa) | Izod impact strength with V notch (J/m) |
|---|---|---|---|---|---|
| Example 1 | 12.6 | 2 | 3.2 | 67.3 | 62.1 |
| Example 2 | 13.7 | 2 | 3.5 | 66.8 | 61.7 |

TABLE 1-continued

|         | | | | | |
|---|---|---|---|---|---|
| Example 3   | 14.1 | 2   | 3.7 | 63.4 | 60.5 |
| Example 4   | 12.7 | 2   | 3.2 | 66.8 | 62.3 |
| Example 5   | 13.2 | 2   | 3.5 | 65.4 | 61.6 |
| Example 6   | 13.5 | 3   | 3.5 | 67.1 | 61.5 |
| Example 7   | 13.3 | 3   | 3.5 | 66.0 | 61.7 |
| Example 8   | 14.2 | 7   | 3.7 | 64.2 | 60.8 |
| Example 9   | 10.7 | 2   | 3.0 | 68.1 | 58.0 |
| Example 10  | 12.5 | 2   | 3.8 | 68.9 | 61.7 |
| Reference 1 | 22.3 | 170 | 5.5 | 56.3 | 52.4 |
| Reference 2 | 19.7 | 50  | 5.0 | 57.5 | 51.7 |
| Reference 3 | 11.3 | 2   | 3.2 | 68.3 | 37.4 |
| Reference 4 | 25.6 | 9   | 4.5 | 69.1 | 67.3 |
| Reference 5 | 14.5 | 4   | 4.1 | 44.7 | 72.2 |

EXAMPLES 11 THROUGH 28 AND REFERENCES 6 THROUGH 10

Preparation of polyoxymethylene resin POM-1

To a twin screw extruder type polymerization machine (25 mm$\phi$, L/D=10.2) were introduced trioxane (450 g/h), 1,3-dioxolane (14 g/h), 100 ppm of boron trifluoride diethyl etherate (2.5% benzene solution) for trioxane and 500 ppm of ethylal, and continuous polymerization was made. The polymerization temperature was controlled to about 75° C. by feeding hot water to the jacket, and the speed of revolution was set 100 rpm. Ethylal as a molecular weight regulator was dissolved in trioxane. Also, in order that 1,3-dioxolane and the catalyst solution would be preliminarily mixed with each other immediately before they were fed to the kneader, a preliminary mixing zone was provided. The polymer was obtained in the form of a white fine powder in an amount of 445 g/h.

To 1 kg of the fine powder thus obtained, a solution of 2.7 g of bis(1,2,2,6,6-pentamethyl-4-piperidinyl) sebacate dissolved in 20 ml of benzene was added, and the mixture was stirred in a Henshel mixer for 10 minutes to deactivate the catalyst, then 5 g of Chiba-Geigy's "Irganox" 245 or triethylene glycol bis(3-(3-t-butyl-5-methyl-4-hydroxyphenyl)propionate, 1 g of calcium stearate and 1 g of melamine were added. The mixture was heated with agitation at 210° C. for 10 minutes, and there was obtained POM-1.

Preparation of polyoxymethylene resin POM-2

With polymerization made similarly to POM-1, the polymer discharged from the kneader was introduced into a 3%aqueous solution of ammonia and stirred. Filtering the polymer out and washing it with water then with acetone. Thereafter, it was introduced into a 10% aqueous solution of ammonia and then heated with agitation in an autoclave at 150° C. for 3 hours. After cooling to room temperature, the polymer was filtered out, washed with water then with acetone and dried, and there was obtained POM-2.

Preparation of polyoxymethylene resin POM-3 n-Hexane was charged to a 30 cm diameter, 3 m depth polymerization vessel having stirring vanes and a formaldehyde supply nozzle provided on the bottom. Dissolving 0.5 part by weight of di-n-butyltin dimaleate in this, formaldehyde gas was introduced through the supply nozzle. The formaldehyde gas was provided by heat decomposition of paraformaldehyde at 140° to 180° C. and upon purification, and it was introduced at a rate of 1.5 kg/h. The temperature in the polymerization vessel was adjusted to 50° C. with cold or hot water fed to the jacket. In the polymerization vessel, there were gradually produced fine polymeric particles, but the polymer slurry was discharged, while the catalytic solution (n-hexane) was fed, so that the polymeric solid component is maintained at about 50% by weight. The withdrawn polymer was filtered out, washed thoroughly with water, then introduced in about 10 times volume of acetic anhydride. Then, adding sodium acetate in an amount of 0.1% by weight of acetic anhydride, the mixture was heated at 139° C. for 5 hours, with agitation. When the reaction mixture cooled to room temperature, the polymer was filtered out, washed thoroughly with acetone and water, then dried, and there was obtained POM-3.

Preparation of polyoxymethylene multi-copolymer (B)

Polymerization was made similarly to POM-1 except addition of another copolymeric unit or the compound of the component (c), and there was obtained the polyoxymethylene multi-copolymer (B).

Preparation of cross-linked POM

Except addition of 1,4-butanediol diglycidyl ether, the polymerization was carried out similarly to POM-2, and there was obtained a cross-linked POM.

For POMs 1-3, there was incorporated said polyoxymethylene multi-copolymer (B) or a cross-linked polyoxymethylene in the case of Reference 9, or talc in the case of Reference 10, melting and kneading were made at 220° to 240° C. with a 45 mm$\phi$, L/D=31.5 twin screw extruding machine with a vent used. The proportions of blending of the copolymeric unit in the examples, that is, the compound of the component (c), and the characteristics of the samples obtained, are shown in Table 2, and the compositions of the polyoxymethylene multi-copolymers or cross-linked POM added in place of the multi-copolymer in References, their proportions with talc, and the characteristics of the samples obtained, are shown in Table 3. Upon comparison of these Examples and References with each other, it will be seen that the polyoxymethylene resin compositions having the polyoxymethylene multi-copolymer incorporated have the spherulite size greatly reduced and the crystallization temperature elevated by about 2° to 8° C. and are distinguished in the mechanical strength and surface appearance.

TABLE 2

Compositions, MI values and additions of polyoxymethylene multi-copolymers

Copoly-

TABLE 2-continued

| Examples | Base POMs (100 parts by weight) | Copolymeric monomer | Copolymerized amount (wt %) | MI values (g/10 min) | Blending ratio (parts by weight) | MI values (g/10 min) | Yield stress (MPa) |
|---|---|---|---|---|---|---|---|
| 11 | POM-1 | GPE | 0.001 | 9.0 | 1.0 | 9.0 | 61.5 |
| 12 | | | 0.1 | 9.0 | 1.0 | 8.9 | 63.1 |
| 13 | | | 0.3 | 9.3 | 0.3 | 9.0 | 62.9 |
| 14 | | | 0.5 | 11.4 | 0.2 | 8.9 | 62.3 |
| 15 | | | 1.0 | 10.3 | 0.001 | 8.9 | 61.7 |
| 16 | | | 1.0 | 10.3 | 0.1 | 9.0 | 62.4 |
| 17 | | | 1.0 | 10.3 | 0.3 | 9.0 | 63.8 |
| 18 | | | 1.0 | 10.3 | 100 | 8.9 | 65.2 |
| 19 | | | 10 | 50.3 | 0.01 | 9.0 | 63.6 |
| 20 | | SO | 0.3 | 8.8 | 0.3 | 8.9 | 62.0 |
| 21 | | | 1.0 | 22.1 | 0.1 | 9.0 | 63.8 |
| 22 | | GNE | 0.3 | 9.1 | 0.3 | 9.1 | 62.6 |
| 23 | POM-2 | GPE | 0.3 | 9.3 | 0.3 | 8.9 | 62.8 |
| 24 | | | 1.0 | 10.3 | 0.1 | 9.0 | 63.6 |
| 25 | | | 1.0 | 10.3 | 0.3 | 9.0 | 63.8 |
| 26 | POM-3 | GPE | 0.3 | 9.3 | 0.3 | 15.2 | 73.1 |
| 27 | | | 1.0 | 10.3 | 0.1 | 15.1 | 73.3 |
| 28 | | | 1.0 | 10.3 | 0.3 | 15.0 | 74.0 |

| Examples | Izod impact strength (with V-notch) (J/m) | Spherulite size (μm) | Melting point Tm (°C.) | Crystallization temp. Tc (°C.) | Tm-Tc (°C.) | Surface appearance |
|---|---|---|---|---|---|---|
| 11 | 58.4 | 19 | 164.1 | 147.9 | 16.2 | Good |
| 12 | 58.5 | 8 | 165.1 | 149.8 | 15.3 | Good |
| 13 | 59.8 | 5 | 163.1 | 147.9 | 15.2 | Good |
| 14 | 60.1 | 6 | 164.0 | 148.3 | 15.7 | Good |
| 15 | 57.9 | 17 | 165.9 | 149.2 | 15.7 | Good |
| 16 | 60.5 | 5 | 163.8 | 149.0 | 14.8 | Good |
| 17 | 61.2 | 3 | 164.2 | 149.3 | 14.9 | Good |
| 18 | 60.4 | 3 | 164.7 | 150.4 | 14.3 | Good |
| 19 | 60.2 | 4 | 163.4 | 149.3 | 14.1 | Good |
| 20 | 59.1 | 7 | 164.2 | 149.0 | 15.2 | Good |
| 21 | 60.6 | 6 | 163.8 | 148.5 | 15.3 | Good |
| 22 | 59.3 | 8 | 164.8 | 148.8 | 16.0 | Good |
| 23 | 60.2 | 5 | 164.7 | 149.5 | 15.2 | Good |
| 24 | 61.0 | 4 | 164.7 | 149.2 | 15.5 | Good |
| 25 | 60.5 | 3 | 164.8 | 149.5 | 15.3 | Good |
| 26 | 69.8 | 10 | 175.4 | 152.3 | 23.1 | Good |
| 27 | 69.4 | 8 | 174.3 | 151.1 | 23.2 | Good |
| 28 | 70.1 | 7 | 174.5 | 152.4 | 22.1 | Good |

GPE: Glycidyl phenyl ether; SO: Styrene oxide; GNE: Glycidyl naphthyl ether

TABLE 3

Compositions, MI values and additions of polyoxymethylene multi-copolymers

| References | Base POMs (100 parts by weight) | Copolymeric monomer | Copolymerized amount (wt %) | MI values (g/10 min) | Blending ratio (parts by weight) | MI values (g/10 min) | Yield stress (MPa) |
|---|---|---|---|---|---|---|---|
| 6 | POM-1 | — | — | — | — | 9.2 | 56.3 |
| 7 | | GPE | 0.0001 | 9.1 | 1.0 | 9.3 | 59.2 |
| 8 | | | 1.0 | 10.3 | 0.0001 | 9.0 | 58.3 |
| 9 | | BDE | 1.0 | 0.9 | 0.1 | 9.0 | 58.0 |
| 10 | | Talc | | — | 0.1 | 9.0 | 57.5 |

| References | Izod impact strength (with V-notch) (J/m) | Spherulite size (μm) | Melting point Tm (°C.) | Crystallization temp. Tc (°C.) | Tm-Tc (°C.) | Surface appearance |
|---|---|---|---|---|---|---|
| 6 | 52.4 | 170 | 165.2 | 142.9 | 22.9 | Bad |
| 7 | 54.6 | 80 | 164.2 | 144.4 | 19.8 | Slightly bad |
| 8 | 52.7 | 90 | 163.6 | 145.1 | 18.5 | Slightly bad |
| 9 | 53.5 | 70 | 165.0 | 146.0 | 19.0 | Slightly bad |
| 10 | 53.1 | 80 | 164.9 | 145.7 | 19.2 | Bad |

GPE: Glycidyl phenyl ether;
BDE: 1,4-Butanediol diglycidyl ether (cross-linked POM)

What is claimed is:

1. Polyoxymethylene multi-copolymer obtainable by copolymerization of
   (a) trioxane,
   (b) at least one cyclic either or formal chosen from the group of ethylene oxide, 1,3-dioxolane, 1,3-dioxepane, 1,3,5-trioxepane and 1,3,6-trioxocane, and (c) at least one compound chosen from the group of glycidyl phenyl ether, styrene oxide and glycidyl naphthyl ether, characterized in that the number average molecular weight of said polyoxymethylene multi-copolymer is from 10,000 to 100,000, that the melting point (Tm) and crystallization temperature (Tc) thereof is in a relationship of $$Tm - Tc < 15 \ (^\circ C.)$$

and that the spherulites are of a size of 10 μm or less.

2. Multi-copolymer set forth in claim 1, characterized in that the copolymeric amount of the cyclic ether or formal compound of the component (b) is 0.01 to 20 parts by weight for 100 parts by weight of trioxane of the component (a).

3. Multi-copolymer set forth in claim 1, characterized in that the copolymeric amount of the cyclic ether or formal compound of the component (b) is 0.1 to 7 parts by weight for 100 parts by weight of trioxane of the component (a).

4. Multi-copolymer set forth in claim 1, characterized in that the copolymeric amount of the compound of the component (c) is 0.001 to 10 parts by weight for 100 parts by weight of trioxane of the component (a).

5. Multi-copolymer set forth in claim 1, characterized in that the copolymeric amount of the compound of the component (c) is 0.01 to 5 parts by weight for 100 parts by weight of trioxane of the component (a).

6. Polyoxymethylene resin composition comprised of:
   (A) 100 parts by weight of a polyoxymethylene polymer; and
   (B) 0.001 to 100 parts by weight of a polyoxymethylene multi-copolymer obtainable by copolymerizing
   (a) trioxane,
   (b) at least one cyclic ether or formal compound chosen from the group of ethylene oxide, 1,3-dioxolane, 1,3-dioxepane, 1,3,5-trioxepane and 1,3,6-trioxocane, and
   (c) at least one compound chosen from the group of glycidyl phenyl ether, styrene oxide and glycidyl naphthyl ether.

7. Resin composition set forth in claim 6, characterized in that the number average molecular weight of the polyoxymethylene multi-copolymer is from 10,000 to 100,000.

8. Resin composition set forth in claim 6, characterized in that the melting point (Tm) and crystallization temperature (Tc) of the polyoxymethylene multi-copolymer are in a relationship of $Tm - Tc < 15 \ (^\circ C.)$.

9. Resin composition set forth in claim 6, characterized in that the spherulites of the polyoxymethylene multi-copolymer are of a size of 10 μm or less.

10. Resin composition set forth in claim 6, characterized in that the polyoxymethylene polymer is an oxymethylene homopolymer.

11. Resin composition set forth in claim 6, characterized in that the polyoxymethylene polymer is a copolymer comprised of 85% by weight or more of an oxymethylene unit or units and 15% by weight or less of an oxyalkylene unit or units having 2 to 8 adjacent carbon atoms.

12. Mold product of a polyoxymethylene multi-copolymer characterized in that said polyoxymethylene multi-copolymer is obtainable by copolymerizing
   (a) trioxane,
   (b) at least one cyclic ether or formal compound chosen from the group of ethylene oxide, 1,3-dioxolane, 1,3-dioxepane, 1,3,5-trioxepane and 1,3,6-trioxocane, and
   (c) at least one compound chosen from the group of glycidyl phenyl ether, styrene oxide and glycidyl naphthyl ether, that the number average molecular weight of said polyoxymethylene multi-copolymer is from 10,000 to 100,000, that the melting point (Tm) and crystallization temperature (Tc) thereof are in a relationship of $$Tm - Tc < 15 \ (^\circ C.)$$

and that the size of the spherulites is 10 μm or less.

13. Mold product set forth in claim 12, characterized in that the molding is extrusion molding.

14. Mold product set forth in claim 12, characterized in that the molding is injection molding.

15. Mold product of a polyoxymethylene resin composition comprised of
   (A) 100 parts by weight of a polyoxymethylene polymer, and
   (B) 0.001 to 100 parts by weight of a polyoxymethylene multi-copolymer obtainable by copolymerizing
   (a) trioxane,
   (b) at least one cyclic ether or formal compound chosen from the group of ethylene oxide, 1,3-dioxolane, 1,3-dioxepane, 1,3-5-trioxepane and 1,3,6-trioxocane and
   (c) at least one compound chosen from the group of glycidyl phenyl ether, styrene oxide and glycidyl naphthyl ether.

16. Mold product set forth in claim 15, characterized in that the molding is extrusion molding.

17. Mold product set forth in claim 15, characterized in that the molding is injection molding.

* * * * *